United States Patent
Pamp et al.

(10) Patent No.: US 8,315,629 B2
(45) Date of Patent: Nov. 20, 2012

(54) ASYMMETRIC UPLINK/DOWNLINK CONNECTIONS IN A MOBILE COMMUNICATION SYSTEM

(75) Inventors: Johan Pamp, Svedala (SE); Bengt Lindoff, Bjärred (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 541 days.

(21) Appl. No.: 12/391,825

(22) Filed: Feb. 24, 2009

(65) Prior Publication Data

US 2010/0216470 A1    Aug. 26, 2010

(51) Int. Cl.
*H04W 36/00* (2009.01)
(52) U.S. Cl. .................. 455/436; 455/67.11; 455/561; 455/434; 455/560
(58) Field of Classification Search .............. 455/436, 455/67.11, 561, 434, 67.13, 560, 11.1, 13.1, 455/41.1, 66.1, 77, 103; 370/328
See application file for complete search history.

(56) References Cited

U.S. PATENT DOCUMENTS

| | | | |
|---|---|---|---|
| 5,487,174 A | | 1/1996 | Persson |
| 6,381,232 B1 | | 4/2002 | Strawczynski et al. |
| 7,389,112 B2 | | 6/2008 | Nilsson et al. |
| 7,424,296 B2 | | 9/2008 | Schwarz et al. |
| 2003/0109284 A1 | | 6/2003 | Akerberg et al. |
| 2004/0228299 A1 | * | 11/2004 | Ito ................................ 370/328 |
| 2005/0159166 A1 | * | 7/2005 | Jonsson et al. ............. 455/452.2 |
| 2008/0232254 A1 | * | 9/2008 | Chhaya et al. ................ 370/236 |
| 2008/0232326 A1 | | 9/2008 | Lindoff et al. |
| 2008/0268859 A1 | | 10/2008 | Lee et al. |

FOREIGN PATENT DOCUMENTS

| | | |
|---|---|---|
| WO | 93/19537 A1 | 9/1993 |
| WO | 03/094541 A1 | 11/2003 |
| WO | 2008/066467 A1 | 6/2008 |

OTHER PUBLICATIONS

PCT International Search Report, mailed May 12, 2010, in connection with International Application No. PCT/EP2010/052023.
PCT Written Opinion, mailed May 12, 2010, in connection with International Application No. PCT/EP2010/052023.
Foutekova, E. et al., "Traffic Asymmetry Balancing in OFDMA-TDD Cellular Networks", Journal of Communications and Networking (JCN), Special Issue on Wireless Cooperative Transmission and its Applications, vol. 10, No. 2, 2008, pp. 137-147.

* cited by examiner

*Primary Examiner* — Charles Appiah
*Assistant Examiner* — Alexander Yi
(74) *Attorney, Agent, or Firm* — Potomac Patent Group PLLC

(57) ABSTRACT

A base station reduces interference from user equipment operating in a neighboring cell by monitoring one or more channels of neighboring base stations to receive a signal transmitted by a user equipment that is being served by one of the neighboring base stations, and detecting when a power level of the signal transmitted by the user equipment exceeds a threshold power level. The base station then uses the received signal transmitted by the user equipment to acquire an identifier of the user equipment. The base station then communicates with a network node of the mobile communication system to arrange for it to serve the user equipment itself but in only the uplink direction. The neighboring base station continues to serve the user equipment in the downlink direction in what is now an asymmetrical uplink/downlink connection.

19 Claims, 9 Drawing Sheets

ASYMMETRIC UPLINK/DOWNLINK CONNECTIONS IN A MOBILE COMMUNICATION SYSTEM

BACKGROUND

The present invention relates to mobile communication systems, and more particularly to methods and apparatuses for serving user equipment in both the uplink and downlink directions in a mobile communication system.

In a mobile communication system, User Equipment (UE) is capable of maintaining its communication service while moving throughout a geographical coverage area of the system. To enable this capability, the system's coverage area is provided with a number of geographically separated base stations that serve as the UE's portal to the mobile communication system. The UE always sends data to, and receives data from, the mobile communication system via a base station. In a typical system, the UE is connected in both the uplink and downlink directions to the base station having the most favorable radio conditions. The area covered by the base station is usually called a cell, and the cell to which the UE is connected is usually referred to as a serving cell.

To achieve compatibility and interoperability between UE's made by various manufacturers, as well as to avoid causing disturbing interference to unrelated devices, mobile communication systems typically need to comply with various standards and government regulations. A number of these are used and well-known in the art. To facilitate this discussion, terminology and network configurations that comply with the Wideband Code Division Multiple Access/High-Speed Packet Access (WCDMA/HSPA) standard are used herein because these are known and will be readily understandable to the person of ordinary skill in the art. However, the use of this terminology and these configurations is done solely for the purpose of example rather than limitation. The various inventive aspects to be described in this document are equally applicable in many different mobile communications systems complying with different standards.

A simplified cell planning diagram is depicted in FIG. 1. A core network (not shown) is connected to a radio access network that includes one or more radio network controllers (RNCs) 101-1, 101-2, . . . ,101-N (generally referred to by reference numeral 101). Each RNC 101 is capable of communicating with every other RNC 101 in the same network. As can be seen in FIG. 1, one RNC 101 connects to one or more base stations, 103-1, 103-2, . . . , 103-M (generally referred to by the reference numeral 103). In a WCDMA/HSPA system, the base station functionality apart from the antenna(s) is denoted "NodeB". The NodeB is a logical node handling the transmission and reception of a set of cells. Logically, the antennas of the cells belong to the NodeB but they are not necessarily located at the same antenna site. Thus, one NodeB can be responsible for one or more cells. It is the ability of serving cells not transmitted from the same antenna site that makes a NodeB different compared to what in other types of systems are called a "Base Transceiver Station (BTS)", "Base Station (BS)", or "Radio Base Station (RBS)". However, in this specification the term "base station" is used as a generic term, rather than a system-specific term, to further emphasize that the invention is not limited to applications in only the specific exemplary systems.

The specific functionality of an RNC can vary from one system to another, but generally an RNC is responsible for controlling base stations with respect to mobility and radio resource management.

Because the RNC 101 can control several base stations 103, it can be responsible for a very large geographical area. Furthermore, the interface between the RNCs 101 makes it possible to have a coordinated approach in the whole coverage area of the network. However, only one RNC 101, denoted the "controlling RNC", is the master of one base station 103. For example, in a WCDMA/HSPA system, the controlling RNC sets the frequencies that the NodeB will use in its cells. The controlling RNC also allocates power and schedules the common channels of the cells of the NodeB. It also configures what codes and maximum power levels will be used for the High-Speed-Downlink Shared CHannel (HS-DSCH). The controlling RNC is also the decider of whether a user is allowed to use the radio resources in a cell belonging to one of its NodeBs and in that case which radio resource.

It should be stressed that the above description of network component functionality (e.g., that of the RNCs 101) is meant to provide only an example. More generally, RNCs 101 should be considered to be network nodes having some intelligence that controls the base stations 103.

When configuring an actual embodiment of a mobile communication system, it is typical for different cells to have different sizes and shapes. This can be due to, for example, different terrain conditions such as buildings or mountains, and/or different transmit power capabilities of the different base stations 103. FIG. 2 is a block diagram illustrating an RNC 205 that controls a number of cells of varying sizes. This diagram illustrates the possibility not only of different size cells, but also of a small cell 201 being placed within a larger cell 203.

To ensure that a serving base station is able to receive transmissions from one of the UEs that it is serving, the UE must transmit its signal at a sufficiently high power level. If the channel conditions are poor and/or if the UE is far away from the serving base station, the UE must transmit at even higher power levels. This detrimentally affects the battery life of the UE. To extend the battery's life, it would be preferable for the UE to transmit at as low a power level as possible.

Another problem with a UE transmitting at excessively high power levels derives from the fact that a UE transmits in all directions. This increases the total interference in the communication system. Again, having the UE transmit at lower power levels would address this problem.

For the above and other reasons, it is desired to provide a way of serving a UE in a mobile communication system in a way that reduces the need for the UE to transmit at high power levels.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a base station in a mobile communication system that comprises a network node operatively connected to a first base station and the second base station. Such operation involves monitoring one or more channels of at least the first base station to receive a signal transmitted by a user equipment that is being served by the first base station. The signals can be, for example, a random access channel signature communicated by the user equipment to the first base station.

Operation further involves detecting that a power level of the signal transmitted by the user equipment exceeds a threshold power level. The received signal transmitted by the user equipment is then used to acquire an identifier of the user equipment. The second base station then communicates with the network node of the mobile communication system to arrange for the second base station to serve the user equipment in only the uplink direction. In some embodiments, the network node is a radio network controller.

The second base station then serves the user equipment in only the uplink direction.

It will be appreciated that by this mechanism, an asymmetrical uplink/downlink connection can be established with the user equipment whereby the user equipment's uplink transmissions no longer need be powerful enough to cause the second base station to experience disturbing interference.

In some embodiments, using the received signal transmitted by the user equipment to acquire an identifier of the user equipment includes using information contained in the received random access channel signal transmitted by the user equipment to identify the first base station that is serving the user equipment. The second base station then communicates with the identified first base station to acquire the identifier of the user equipment.

In some embodiments, communicating with the network node of the mobile communication system to arrange for the second base station to serve the user equipment in only the uplink direction comprises communicating the identifier of the user equipment to the network node. In response, the second base station receives, from the network node, one or more control signals that instruct the second base station to serve the user equipment in only the uplink direction. In some of these embodiments, the one or more control signals that instruct the second base station to serve the user equipment in only the uplink direction include uplink transmit parameters to be used when serving the user equipment. In some but not necessarily all embodiments, the one or more control signals that instruct the second base station to serve the user equipment in only the uplink direction include an instruction that indicates whether the second base station is to act as a master or as a slave.

In an aspect of some embodiments, serving the user equipment in only the uplink direction comprises receiving a receive status report from the user equipment, wherein the receive status report indicates either an acknowledgement or a negative acknowledgement. The receive status report is then forwarded to the network node.

In some embodiments, serving the user equipment in only the uplink direction comprises forming uplink transmit parameters to be used by the user equipment; and communicating the uplink transmit parameters to the network node for forwarding to the user equipment via the identified first base station.

In some embodiments, serving the user equipment in only the uplink direction comprises receiving feedback information communicated by the user equipment on an uplink data channel; and forwarding the received feedback information to the network node. The feedback information can comprise, for example, a receive status report that indicates either an acknowledgement or a negative acknowledgement in response to a data packet received on the downlink data channel. The feedback information can additionally or alternatively comprise signaling information that controls user equipment performance.

From the point of view of the network node, operation includes receiving a request from the second base station to serve a user equipment in only an uplink direction. The network node then sends a first set of one or more control signals to the second base station, wherein the first set of one or more control signals instructs the second base station to serve the user equipment in only the uplink direction. The network node also sends a second set of one or more control signals to the first base station that is presently serving the user equipment in both the uplink and downlink directions, wherein the second set of one or more control signals instructs the first base station to serve the user equipment in only the downlink direction.

The first set of one or more control signals that instruct the second base station to serve the user equipment in only the uplink direction can include, for example, uplink transmit parameters to be used when serving the user equipment. The uplink transmit parameters can then also be sent to the first base station for forwarding to the user equipment.

BRIEF DESCRIPTION OF THE DRAWINGS

The objects and advantages of the invention will be understood by reading the following detailed description in conjunction with the drawings in which.

DETAILED DESCRIPTION

Figure 1:
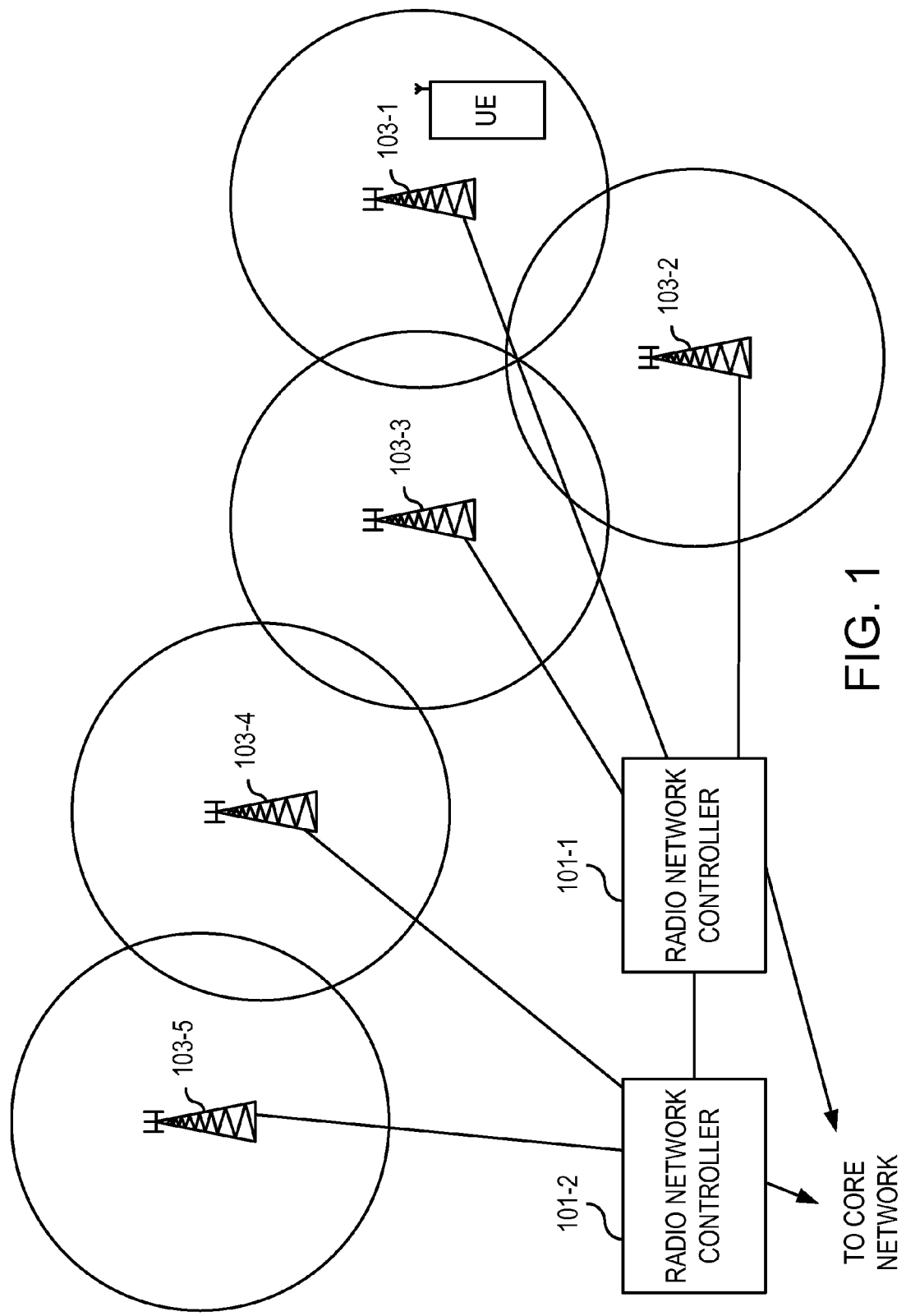
FIG. 1 is a simplified cell planning diagram of a mobile communication system.
Figure 2:
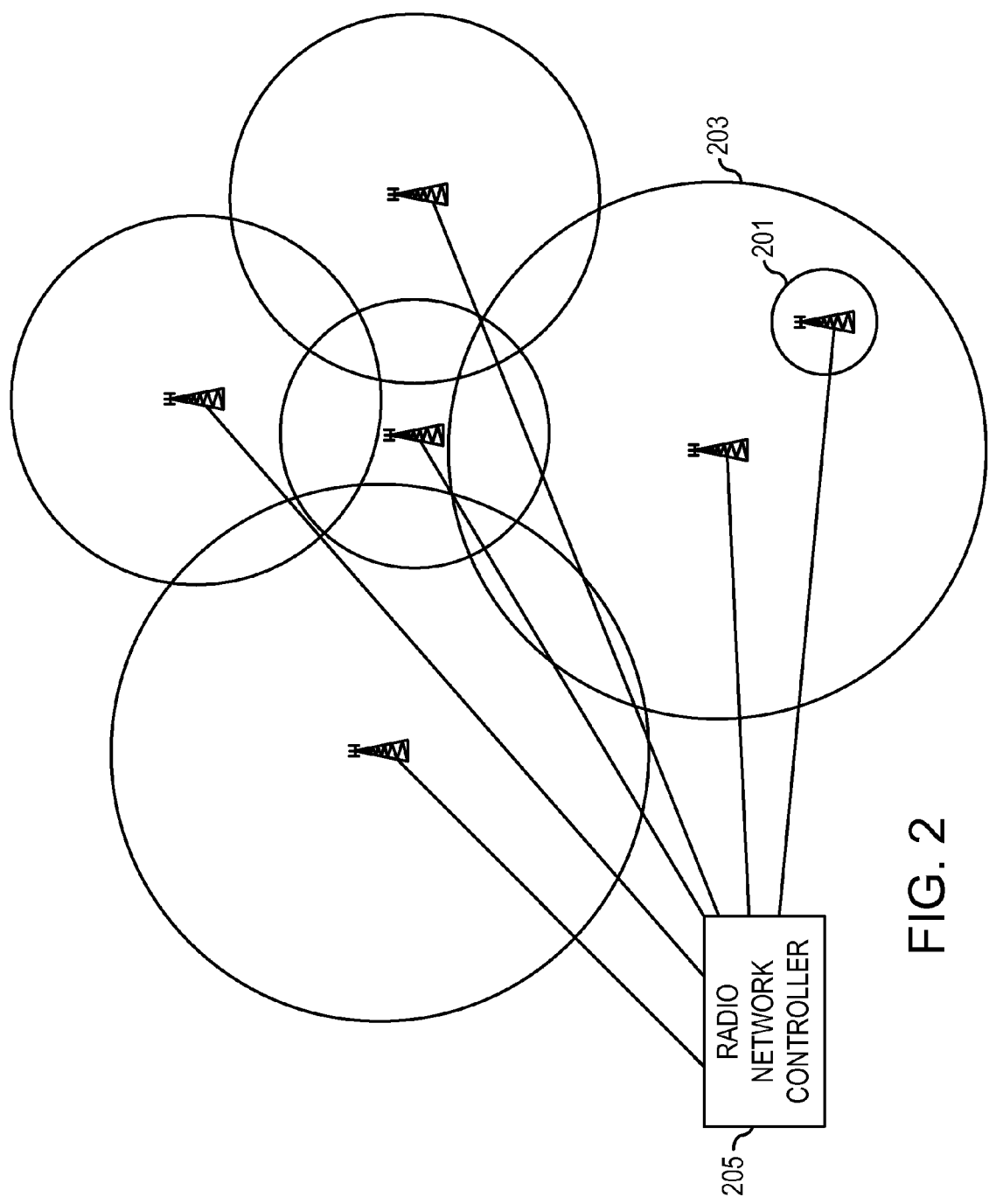
FIG. 2 is a block diagram illustrating a radio network controller that controls a number of cells of varying sizes.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of embodiments consistent with the invention involves serving a UE by means of an asymmetric uplink/downlink connection, whereby one base station provides service in the downlink direction, and another (neighboring) base station provides service in the uplink direction. When established under appropriate circumstances (discussed in detail below), this arrangement allows the UE to operate at lower transmit power levels than would otherwise be required if uplink and downlink services were both provided by the same base station.

In another aspect of embodiments consistent with the invention, the mobile communication network is able to determine which UEs would benefit from establishment of an asymmetric uplink/downlink connection, and then take appropriate actions to establish such a connection.

An overview of the process starts with a UE initially establishing a symmetric connection with a first base station (i.e., the first base station services the UE in both the uplink and downlink directions). Selection of a base station can be based on, for example, which of a number of detected base stations has the best downlink channel quality. Uplink and downlink traffic between the UE and the first base station are then exchanged in the typical manner, as is known in the art.

A second base station that neighbors the first base station has circuitry adapted to monitor one or more channels of one or more of its neighboring base stations (which includes the first base station), respectively, to receive a signal transmitted by the user equipment. The monitored channel can be, for example, the Random Access CHannel (RACH). Under typical circumstances, the received RACH transmissions of a UE in a neighboring cell should not exceed a threshold level (e.g., it should not be stronger than the received RACH transmissions of a base station's own UEs). Consequently, if received RACH transmissions of a UE in a neighboring cell exceed the threshold level, that UE can be considered to cause interference. Therefore in this example, if the second base station detects that the UE's RACH transmissions to the first base station exceed the threshold level for the second base station, this detection triggers the steps that will result in the second base station serving the UE in the uplink direction, while the first base station continues to serve the UE in the downlink direction.

In exemplary (i.e., non-limiting) examples, these steps include the second base station deriving the identity of the UE and its serving cell (i.e., the first base station) from the received RACH signal. The second base station then contacts its RNC, which arranges for the UE's uplink service to be handed over from the first base station to the second base station. (The first base station continues to serve the UE in the downlink direction.) After the handover, the UE's situation is improved because it is connected to the network in the uplink direction by means of the base station having the best radio conditions for that direction, and is also connected to the network in the downlink direction by means of the base station having the best radio conditions for that direction. All of the downlink communications (e.g., downlink data traffic and uplink feedback) are made via one base station (e.g., the first base station), and all of the uplink communications (e.g., the UE's uplink data traffic and downlink feedback channels) are made via another base station (e.g., the second base station).

In some alternative embodiments, the UE has its downlink data channels and corresponding uplink feedback channels (e.g., Channel Quality Indicator—"CQI"—, ACK/NAK, etc.) connected to one base station (e.g., the first base station), while the uplink data channels and corresponding downlink feedback channels re connected to another base station (e.g., the second base station).

These and other aspects are now described in greater detail in the following.

Figure 3:
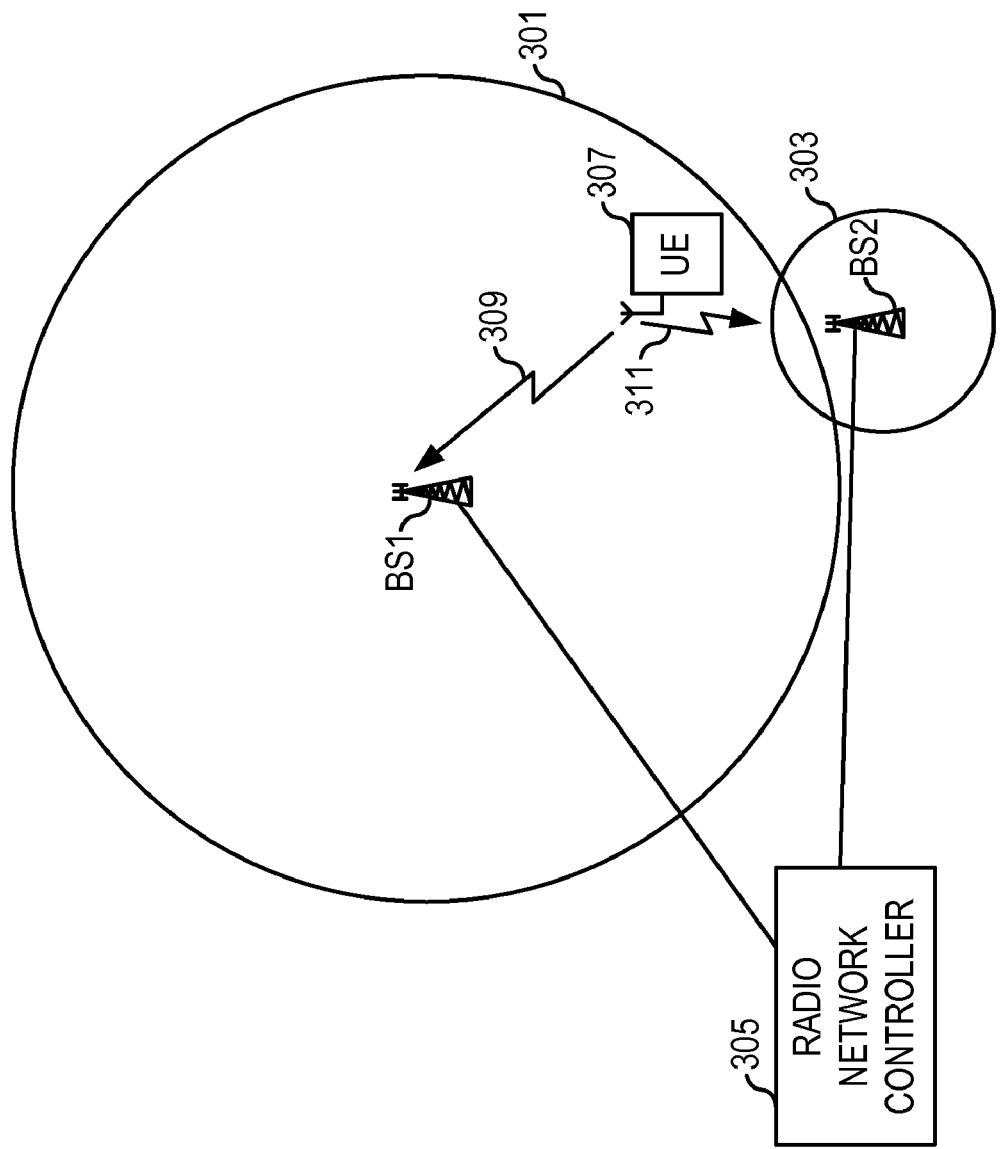
FIG. 3 is a diagram of a cell arrangement in which various aspects of the invention can advantageously be put to use.

FIG. 3 is a diagram of a cell arrangement in which various aspects of the invention can advantageously be put to use. A large cell 301 (served by a first base station) is adjacent to a small cell 303 (served by a second base station), both of which are controlled by an RNC 305. In this example, a UE 307 is situated within the service area of the first base station even though it is actually closer to the second base station. Since the second base station transmits at a power level large enough only to serve its predefined small cell 303, the UE 307 cannot hear any signals transmitted by the second base station.

The reverse is not true, however: Because the UE 307 is located close to the border of the large cell 301 it must transmit at a high power level in order to be heard by the first base station. As a result, the second base station can easily hear the signals from the UE 307. This is illustrated in FIG. 3 by the UE's signal 309 that is directed to the first base station and that has a high power signal component 311 that radiates toward the second base station. If the first and second base stations both utilize the same frequency band, this will result in the second base station experiencing a large amount of interference from the UE 307.

The UE 307 need not be located near the border of the large cell 301 for the various inventive aspects to be of use. For example, even if the UE is located closer to the first base station it may, nonetheless, be required to transmit its signal 309 at a very high transmit power level due to, for example, a fading dip, which can cause the path loss in the uplink and downlink directions to differ by as much as 10 dB. This can similarly result in a high power signal component 311 being directed toward the second base station.

In such and similar situations, the second base station can solve its interference problem while at the same time enabling the UE 307 to conserve its battery power by serving the UE 307 in the uplink direction, while continuing to allow the UE 307 to be served by the first base station in the downlink direction. This last aspect is necessary because the UE 307, in this example, is too far away from the second base station to be able to hear its downlink signals.

Figure 4:
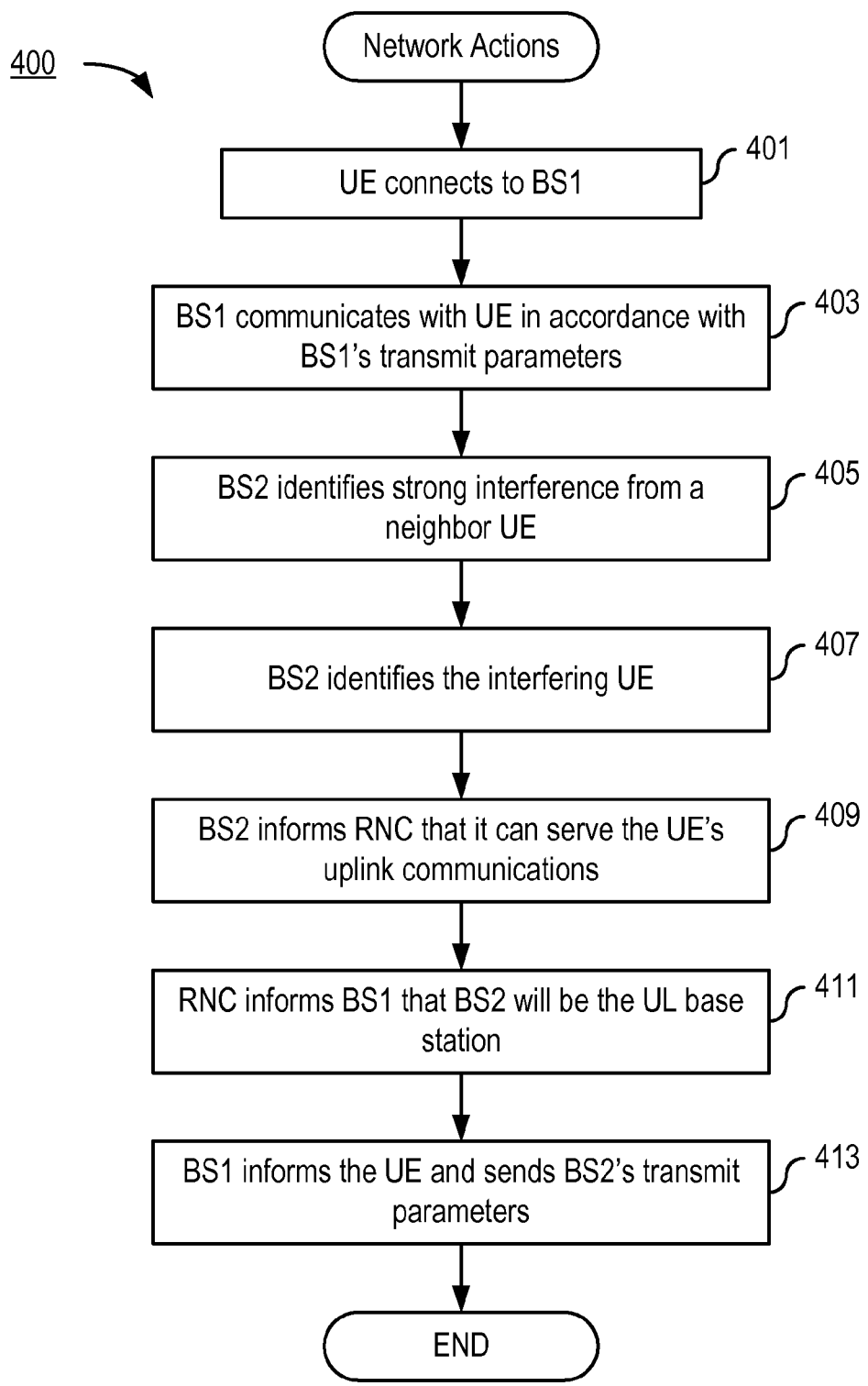
FIG. 4 is, in one respect, a flow diagram of exemplary steps/processes carried out in one or more components of a mobile communication system in accordance with aspects of the invention.

FIG. 4 is, in one respect, a flow diagram of exemplary steps/processes carried out in one or more components of a mobile communication system in accordance with aspects of the invention in an exemplary embodiment. FIG. 4 can also be considered to depict a mobile communication system 400 comprising various circuitry configured to carry out the functions described herein.

Using conventional, well-known procedures, a UE establishes a symmetrical uplink/downlink connection to a first base station ("BS1") (step 401). As a result, the first base station communicates with the UE in accordance with the first base station's transmit parameters (step 403). This includes the UE transmitting to the first base station using the first base station's uplink transmit parameters. Transmit parameters differ from one Radio Access Technology (RAT) to another. As used herein, the term "transmit parameters" is used generically to refer to any type of information that the UE must know in order to transmit in a way that will enable the base station to receive and understand its transmission. Timing parameters can include, but are not necessarily limited to, such things as scrambling codes, channelization codes, frequency information, transmission power, and the like. These parameters are unique for each base station within a system-defined coverage area.

Under any of a number of circumstances, such as but not limited to those described above, a second base station ("BS2") identifies strong interference from the neighboring UE (step 405). It is not necessary that the first base station and the second base station utilize the same RAT or frequency band.

The second base station then identifies the interfering UE (step 407). This can be done by, for example, equipping the second base station with an extended Random Access CHannel (RACH) detector that allows it to monitor the interfering UE's transmission on the first base station's RACH. These transmissions will include a RACH signature that is typically a function of a cell's Identity parameter. Using this information, the second base station identifies which base station is serving the interfering UE. The second base station therefore communicates with the serving cell (first base station) (e.g., by means of the mobile communication system's backbone network), asking it the identity of the UE that sent the particular RACH signature. The first base station then returns the requested information to the second base station.

Once the second base station has the identity of the interfering UE, it, in effect, informs the RNC that it can hear the UE at an excessively high level and can serve the identified UE in the uplink direction (step 409). (It will be recalled that WCDMA/HSPA terminology is used herein as a matter of convenience, and that the RNC can be, but need not be, an RNC as defined by 3GPP specifications. Rather, the RNC can be any node in the communications network.)

The RNC responds by deciding whether an asymmetric uplink/downlink connection should be established. This decision can be based, for example, on whether pertinent nodes in the network can handle the changed load distribution that would result from the proposed asymmetrical connection. If the asymmetrical connection is to be established, the RNC also decides which node in the network will be the master and which will be the slave. As used herein, the term "master" refers to that node in the network that is responsible for functions such as controlling a data flow, including determining from a receive status report (e.g., acknowledgement/negative acknowledgement—"ACK/NAK") whether a transmitted packet has been successfully received or whether it instead needs to be retransmitted. By contrast, a "slave" does not perform these functions. Thus, when the communication system network provides a data packet to be transmitted to a UE, that packet must first pass through a master node so that it can be incorporated into a flow of data to that UE. A master node can be a base station, RNC, or another node in the communications network.

Assuming that the RNC decides to establish an asymmetric uplink/downlink connection, it informs the existing serving cell (first base station) that an asymmetric uplink/downlink connection is to be established for the UE, with the second base station serving the UE in the uplink direction (step 411). The first base station in turn informs the UE of the new uplink transmit parameters that it should use (step 413). These new uplink transmit parameters will cause the UE's transmissions to be directed to the second base station, which is also informed of these parameters so that it can receive the UE's uplink transmissions.

Taking an example in which the RNC is the master node and the first and second base stations are slaves, operation of the asymmetrical uplink/downlink connection involves the RNC sending all downlink data packets via the first base station to the UE. A receive status report (e.g., ACK/NAK) is sent on the uplink to the second base station, which forwards that information to the RNC. The second base station repeatedly transmits new uplink transmit parameters to the UE via the RNC and the first base station. The first and second base stations act as intermediaries, and simply forward all information either to the UE or to the RNC, as appropriate. Those of ordinary skill in the art will appreciate that other master/slave configurations are also possible.

In another aspect of embodiments consistent with the invention, the extended RACH detector can also be used to detect the presence of the UE's interference (e.g., step 405). To do this, the base station uses an extended RACH detector to monitor the RACH transmissions of UEs that are being served by other cells. When a RACH signature is received whose power exceeds a given threshold value, the detected UE can be considered to interfere. In such embodiments, the threshold value is advantageously set based on what a typical RACH power level would be for a UE being served by the base station itself (i.e., not a UE in a neighboring cell).

Figure 5:
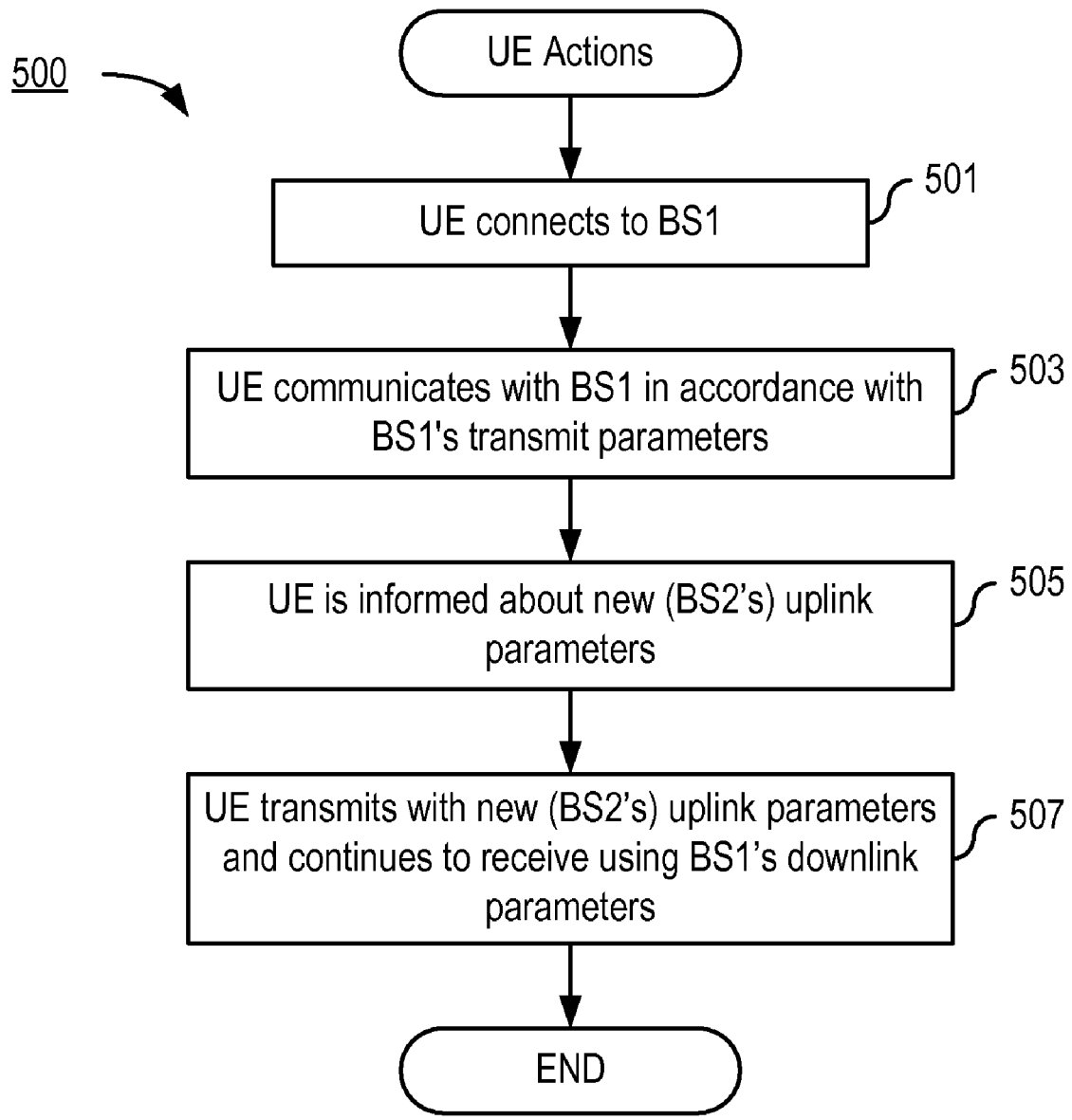
FIG. 5 is, in one respect, a flow diagram of exemplary steps/processes carried out in a UE in accordance with aspects of the invention in an exemplary embodiment.

FIG. 5 is, in one respect, a flow diagram of exemplary steps/processes carried out in a UE in accordance with aspects of the invention in an exemplary embodiment. FIG. 5 can also be considered to depict a UE 500 comprising various circuitry configured to carry out the functions described herein.

Using conventional, well-known procedures, the UE 500 establishes a connection to a first base station (step 501). As a result, the first base station communicates with the UE 500 in accordance with the first base station's transmit parameters (step 503). This includes the UE transmitting to the first base station using the first base station's uplink transmit parameters.

At some point in time, the UE 500 receives new transmit parameters from the first base station (step 505). These transmit parameters will cause the UE 500 to send uplink transmissions for reception by the second base station. It is permissive, but not essential in all embodiments, for the UE 500 to know that it is utilizing an asymmetrical uplink/downlink connection involving two base stations.

Consequently, the UE 500 continues receiving downlink information from its original serving cell (first base station) but transmits uplink information in accordance with the new transmit parameters (the second base station's) (step 507).

An aspect of embodiments consistent with the invention involves feedback information, such as, but not limited to, one or more of the following:

a receive status report (e.g., ACK/NAK) that a receiver returns to a transmitter to inform the status of a received packet;
  channel quality index;
  pre-coding index;
  signaling utilized to achieve fast optimized layer 1 performance.

In a first embodiment, all downlink communications are made via the original base station (e.g., the first base station), and all uplink communications are made via the second base station. Consequently, the second base station receives the UE's feedback information and relays this to the RNC (which possibly forwards this on to the first base station).

In a second embodiment, a UE has its downlink data channels and corresponding uplink feedback channels connected to a single (first) base station, while the uplink data channels are connected to another (second) base station. Downlink feedback information generated by the second base station must be relayed to the UE via the first base station, however, since the UE is unable to hear the second base station's transmissions. With this arrangement, the first base station can receive feedback information directly from the UE instead of having to rely on this information being forwarded by the second base station through the RNC.

Figure 6:
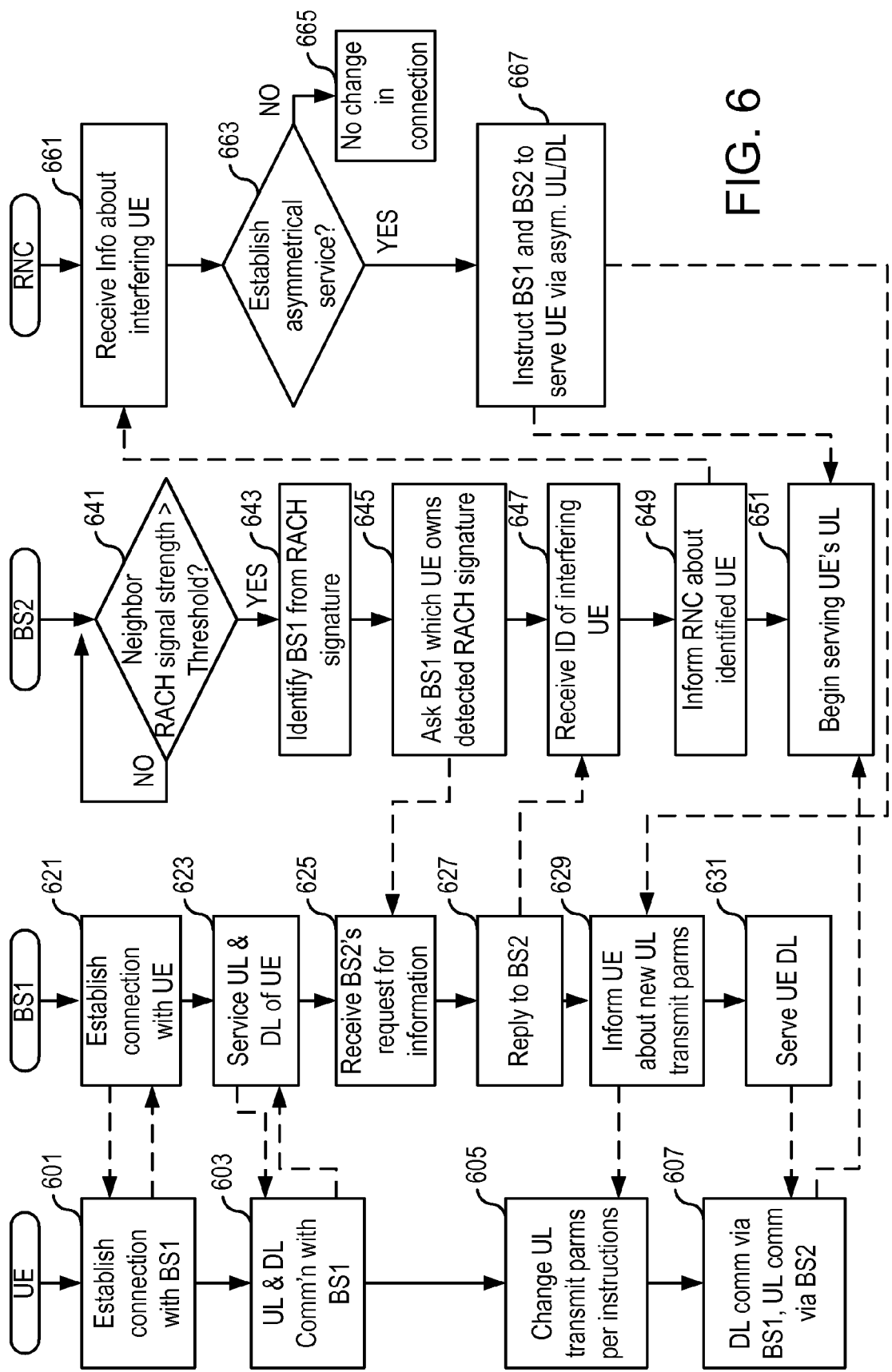
FIG. 6 is, in one respect, a flow diagram of exemplary steps/processes carried out in a communication system in accordance with aspects of the invention in an exemplary embodiment.

FIG. 6 is, in one respect, a flow diagram of exemplary steps/processes carried out in a communication system in accordance with aspects of the invention in an exemplary embodiment. The communication system comprises a first base station, a second base station that neighbors the first base station, and an RNC that controls the first and second base station. In this example, a UE is operating within the service area of the communication system. FIG. 6 can also be considered to depict various circuitry configured to carry out the functions described herein.

Using conventional, well-known procedures, the UE and the first base station exchange signals that cause a connection to be established, with the first base station acting as the UE's serving base station (steps 601, 621). The UE and the first base station then exchange uplink and downlink signals (steps 603, 623) as part of the first base station serving the UE's operation. In particular, the UE communicates in the uplink direction in accordance with the first base station's transmit parameters.

Meanwhile, a second base station has been monitoring RACH signals from its neighbors, and tests these to detect if the signal strength of any of these is exceeding a threshold level (decision block 641). As mentioned earlier, the threshold level set based on the signal power level that the second base station would expect to see from a UE within its own service area. So long as no neighboring RACH signals exceed the threshold level ("NO" path out of decision block 641), the neighboring signals are not considered to be troublesome interference requiring any further steps.

However, if the signal strength of a RACH signal from a neighboring UE exceeds the threshold ("YES" path out of decision block 641), the second base station uses the RACH signal to identify which neighboring base station is serving the interfering UE (step 643). For purposes of this example, the serving base station of the interfering UE is the first base station.

The second base station then sends an inquiry to the first base station (e.g., via the mobile communication system's backbone network) to find out the identity of the UE associated with the excessively powerful RACH signal (step 645). The first base station receives the second base station's inquiry (step 625), ascertains the requested information and sends this back to the second base station (steps 627, 647). The second base station then reports the identifier of the interfering UE to the RNC and either implicitly or explicitly requests that it serve the UE in the uplink direction as part of an asymmetric uplink/downlink connection (step 649).

The RNC receives the information about the interfering UE from the second base station (step 661) and decides whether to establish the asymmetrical connection (decision block 663). As mentioned earlier, this decision can be based, for example, on whether pertinent nodes in the network can handle the changed load distribution that would result from the proposed asymmetrical uplink/downlink connection. If the decision is not to establish the asymmetrical communication link ("NO" path out of decision block 663), then no changes are made to the UE's connection type (step 665).

However, if the RNC decides to establish asymmetrical service for the UE ("YES" path out of decision block 633) then it provides instructions to the first base station and to the second base station that establish the asymmetrical uplink/downlink connection (step 667). These instructions include uplink transmit parameters that the UE is to use for communicating in the uplink direction.

In response to receipt of the instructions from the RNC, the first base station forwards the new uplink transmit parameters to the UE step 629). The UE receives these and changes its uplink transmit parameters accordingly (step 605). The first base station continues to serve the UE in the downlink direction (step 631). As mentioned earlier, in some embodiments this means that the UE's feedback information will first be received by the second base station, which will then forward that feedback information to the first base station. Similarly, when the UE sends uplink data to the second base station, the second base station might generate feedback information intended for the UE. However, since the second base station is incapable of communicating with the UE directly, it forwards its feedback information through the first base station, which passes it along to the UE.

In alternative embodiments, serving the UE in the downlink direction means that the first base station sends downlink data to the UE, and directly receives the UE's feedback information from the UE, since the first base station is capable of hearing the UE's transmissions.

The second base station also receives instructions about the asymmetrical uplink/downlink connection from the RNC, and in response to these the second base station begins serving the UE in the uplink direction (step 651). As mentioned earlier, in some embodiments this means that the second base station will receive feedback information from the UE that is intended for the first base station. Accordingly, the second base station forwards this feedback information to the first base station (e.g., via the RNC). In alternative embodiments, serving the first base station sends downlink data to the UE, and directly receives the UE's feedback information from the UE. Thus, the second base station need not be involved in the UE's feedback information. However, in response to receipt of the UE's uplink data, the second base station may generate its own feedback information intended for receipt by the UE. Since it cannot send this information directly to the UE, it sends it to the UE via the communication network (e.g., via the RNC and the first base station).

With the first base station serving the UE in the downlink direction and the second base station serving the UE in the uplink direction, the UE accordingly receives downlink transmissions from the first base station and sends uplink transmissions to the second base station (step 607).

Figure 7A:
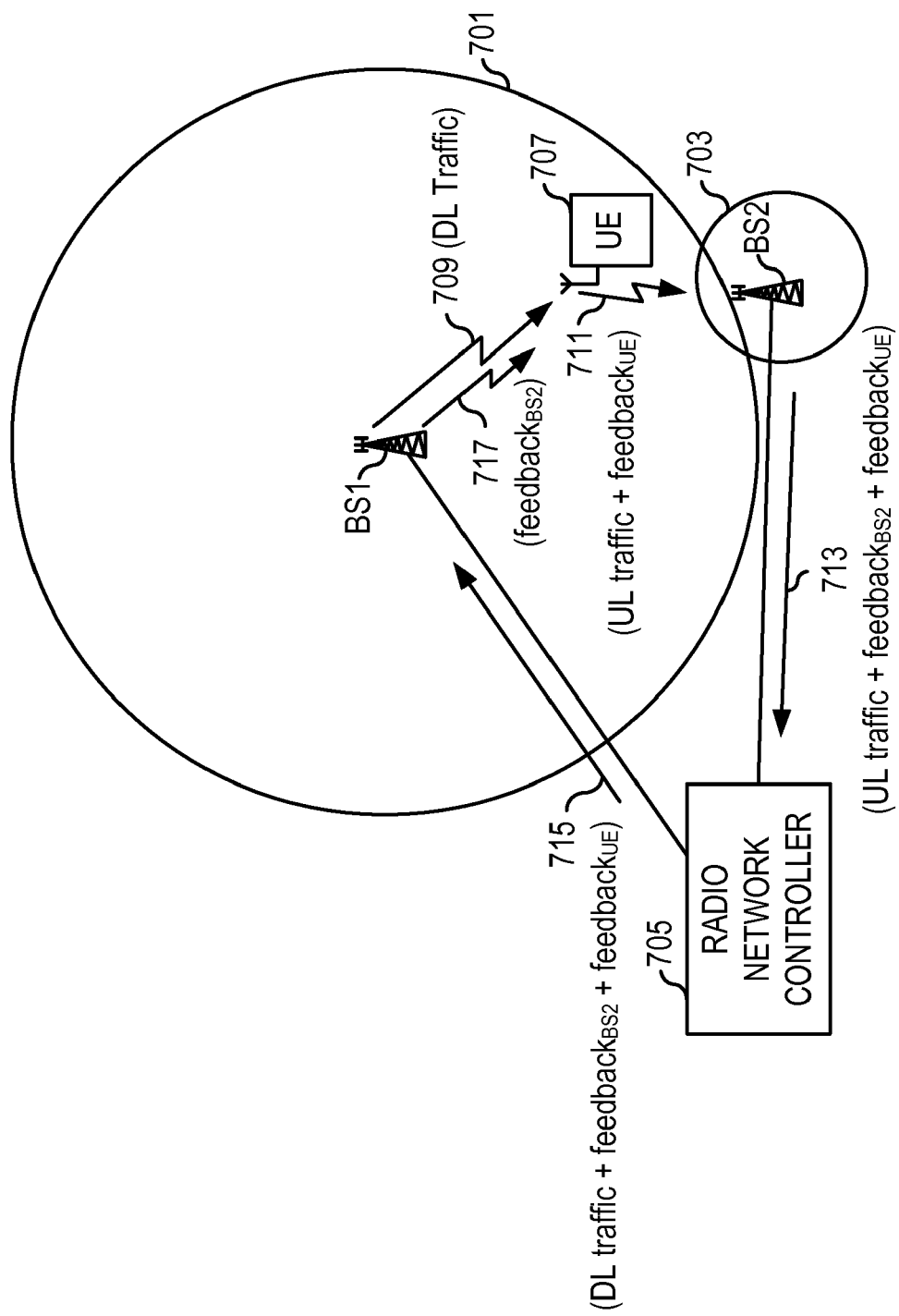
FIGS. 7a and 7b are diagrams of a cell arrangement in which various aspects of different alternative embodiments of the invention have been put to use.

Several different ways of handling feedback information will now be further discussed with reference to FIGS. 7a and 7b. FIG. 7a is a diagram of a cell arrangement in which various aspects of the invention have been put to use. A large cell 701 served by a first base station is adjacent to a small cell 703 served by a second base station, both of which are controlled by an RNC 705. In this example, a UE 707 is situated within the service area of the first base station even though it is actually closer to the second base station. Since the second base station transmits at a power level large enough only to serve its predefined small cell 703, the UE 707 cannot hear any signals transmitted by the second base station.

The reverse is not true, however: Because the UE 707 is located close to the border of the large cell 701 it must transmit at a high power level in order to be heard by the first base station. As a result, the second base station can easily hear the signals from the UE 707. Because of interference from the UE 707, the second base station has contacted the RNC 705 and arranged for the UE 707 to be served by an asymmetrical connection in which downlink service is provided by the first base station and uplink service is provided by the second base station.

This means that the first base station sends downlink data to the UE 707 (step 709). The UE 707 generates feedback (feedback$_{UE}$) intended for the first base station. In this embodiment, however, all of the UE's uplink communications must be sent to the second base station. Consequently, all uplink data as well as the UE's feedback information is sent to the second base station (step 711). The second base station receives the uplink traffic and the UE's feedback information. The second base station also generates its own feedback information intended for receipt by the UE 707. However, because it is not possible for the second base station to transmit directly to the UE 707, the second base station forwards the uplink traffic, the UE's feedback, and also its own feedback (feedback$_{BS2}$) to the RNC 705 (step 713).

The RNC processes the uplink traffic in accordance with known methodology, and forwards the UE's feedback, the second base station's feedback, and any additional downlink data to the first base station (step 715).

The first base station is the intended recipient of the UE's feedback, and utilizes this in accordance with known methodologies (e.g., if the feedback is a receive status report, the first base station will decide whether a packet needs to be retransmitted to the UE 707 based on whether the feedback is an ACK or a NAK). The first base station also forwards the second base station's feedback to the UE 707 (step 717).

Figure 7B:
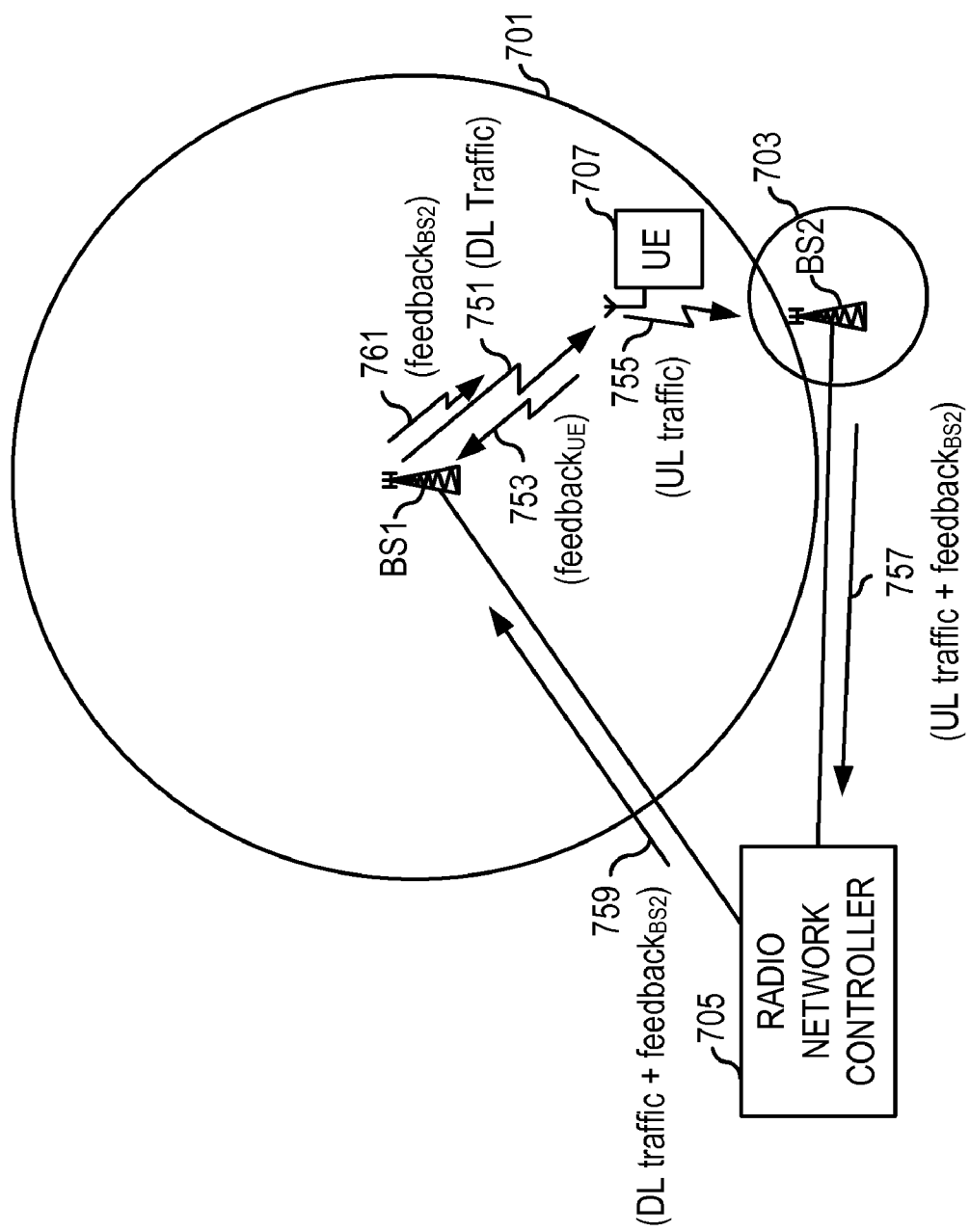

FIG. 7b is a diagram of a cell arrangement in which various aspects of an alternative embodiment of the invention have been put to use. As in the previous example, a large cell 701 served by a first base station is adjacent to a small cell 703 served by a second base station, both of which are controlled by an RNC 705. The UE 707 is situated within the service area of the first base station even though it is actually closer to the second base station. Since the second base station transmits at a power level large enough only to serve its predefined small cell 703, the UE 707 cannot hear any signals transmitted by the second base station.

The UE's high transmission power level causes the second base station to experience interference. Consequently, the second base station has contacted the RNC 705 and arranged for the UE 707 to be served by an asymmetrical connection in which downlink service is provided by the first base station and uplink service is provided by the second base station. In this embodiment, however, providing downlink service to the UE 707 includes the UE 707 sending its feedback information directly to the first base station instead of having to have this passed through the second base station.

Accordingly, the first base station sends downlink data to the UE 707 (step 751). The UE 707 generates feedback (feedback$_{UE}$) that it transmits directly back to the first base station (step 753). The UE's other uplink information (UL traffic) must be transmitted to the second base station, however (step 755). The second base station receives the uplink traffic. The second base station also generates its own feedback information intended for receipt by the UE 707. However, because it is not possible for the second base station to transmit directly to the UE 707, the second base station forwards the uplink traffic and its own feedback (feedback$_{BS2}$) to the RNC 705 (step 757).

The RNC processes the uplink traffic in accordance with known methodology, and forwards the first base station's feedback and any additional downlink data to the first base station (step 759).

The first base station forwards the second base station's feedback to the UE 707 (step 761).

Figure 8:
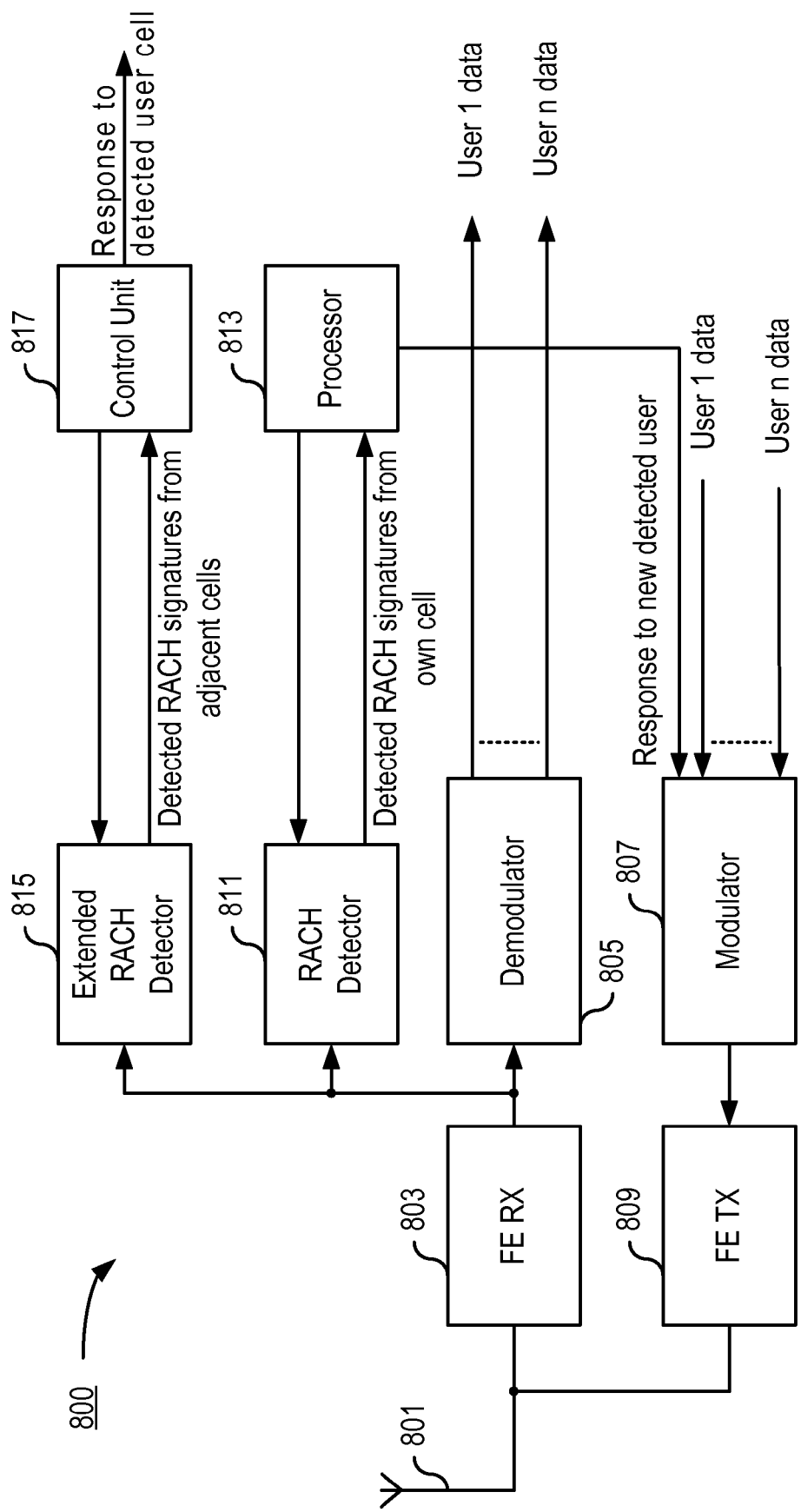
FIG. 8 is a block diagram of exemplary transceiver equipment 800 for carrying out aspects of the invention at a node in a communication system (e.g., a base station).

FIG. 8 is a block diagram of exemplary transceiver equipment 800 for carrying out aspects of the invention at a node in a communication system (e.g., a base station). The transceiver equipment 800 includes an antenna 801 that receives radio frequency signals and supplies these to a front-end receiver (FE RX) 803. The front-end receiver 803 uses known methodology to capture a part of the received radio signal that makes up one or more desired channels and process this to generate a baseband signal containing modulated information. The baseband signal is supplied to a demodulator 805 that uses known methodology to convert the modulated information into user data for some number of users.

Data to be transmitted by the transceiver equipment 800 is supplied to a modulator 807 that uses that data to modulate a signal by means of known methodology. The modulated signal, which is at a baseband frequency, is supplied to a front-end transmitter (FE TX) 809 that processes the modulated baseband signal in accordance with known methodology to produce a signal that is suitable for transmission on an antenna. Such processing includes up-conversion to a desired radio frequency and power amplification. In this exemplary embodiment, the antenna 801 is shared between the receiver and transmitter sections of the transceiver equipment 800. In alternative embodiments, separate antennas can be employed.

The transceiver equipment 800 further includes a RACH detector 811 that monitors the baseband signal supplied at the output of the front-end receiver 803 and detects when a RACH signal has been received from any of the UEs operating within the service area of the transceiver equipment 800. The RACH detector 811 is controlled by processor circuitry 813 that instructs the RACH detector 811 which RACH signatures it should try to detect. When the RACH detector 811 detects one of the sought RACH signature (i.e., from a UE operating within its own service area), the detected signature is supplied to the processor circuitry 813, which uses known methodology to generate a response to be transmitted to the detected UE. The response signal is accordingly supplied to the modulator 807 so that it will be transmitted to the detected UE.

In an aspect of embodiments consistent with the invention, the transceiver equipment 800 also includes circuitry configured to monitor one or more channels of one or more neighboring base stations, respectively, to receive a signal transmitted by a UE that is being served by one of the one or more neighboring base stations. In the exemplary embodiment, the channels being monitored are the neighbors' RACH channels, and this is done by an extended RACH detector 815. The extended RACH detector 815 can be implemented as circuitry that is separate from RACH detector 811, but this need not be the case in all embodiments. The extended RACH detector 815 is controlled by control circuitry 817 that instructs the extended RACH detector 815 which RACH signatures it should try to detect. When the extended RACH detector 815 detects one of the sought RACH signature (i.e., from a UE operating within the service area of one of the neighboring cells), the detected RACH signature is supplied to the control circuitry 817 which responds by generating suitable control signals to cause transceiver circuitry to carry out the various functions as described earlier with reference to FIGS. 4 and 6.

The invention has been described with reference to particular embodiments. However, it will be readily apparent to those skilled in the art that it is possible to embody the invention in specific forms other than those of the embodiment described above.

For example, the above embodiments all involved a single RNC. However, in some situations, neighboring cells are controlled by different RNCs. For example, consider the cells served by the base stations 103-4 and 103-5 depicted in FIG. 1. It is possible that, under certain circumstances, an asymmetric uplink/downlink connection could be useful to a UE situated in one of these cells. It will be readily apparent to one of ordinary skill in the art that the principles set forth above are equally applicable here as well, but with two RNCs (e.g., the RNCs 101-1 and 101-2) being involved instead of one. Such embodiments may include the RNCs 101-1, 101-2 deciding which of them will be the controlling RNC for the connection. Because of the possibility of such embodiments, the term "radio network controller" is used herein broadly to mean not only a single node in the communication network, but also several nodes working together to perform the functions that are described herein in exemplary embodiments having only a single node.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a second base station in a mobile communication system that comprises a radio network controller (RNC) operatively connected to a first base station and the second base station, the method comprising:

the second base station performing:
monitoring one or more channels of at least the first base station to receive a signal transmitted by a user equipment that is being served by the first base station;
detecting that a power level of the signal transmitted by the user equipment exceeds a threshold power level;
using the received signal transmitted by the user equipment to acquire an identifier of the user equipment;
communicating one or more control signals with the radio network controller (RNC) of the mobile communication system to arrange for the second base station to serve the user equipment in only the uplink direction, wherein the one or more communicated control signals include uplink transmit parameters to be used when serving the user equipment and include an instruction that indicates whether the second base station is to act as a master or a slave; and
serving the user equipment in only the uplink direction,
wherein monitoring one or more channels of at least the first base station to receive a signal transmitted by the user equipment comprises:
monitoring a random access channel (RACH) of the first base station to receive a random access channel (RACH) signal transmitted by the user equipment.

2. The method of claim 1, wherein the received signal from the user equipment is an uplink transmission from the user equipment to the first base station.

3. The method of claim 1, wherein using the received signal transmitted by the user equipment to acquire an identifier of the user equipment comprises:
using information contained in the received random access channel (RACH) signal transmitted by the user equipment to identify the first base station that is serving the user equipment; and
communicating with the identified first base station to acquire the identifier of the user equipment.

4. The method of claim 3, wherein communicating with the radio network controller (RNC) of the mobile communication system to arrange for the second base station to serve the user equipment in only the uplink direction comprises:
communicating the identifier of the user equipment to the radio network controller (RNC).

5. The method of claim 1, wherein serving the user equipment in only the uplink direction comprises:
receiving a receive status report from the user equipment, wherein the receive status report indicates either an acknowledgement or a negative acknowledgement; and
forwarding the receive status report to the radio network controller (RNC).

6. The method of claim 1, wherein communicating with the radio network controller (RNC) comprises:
forming the uplink transmit parameters to be used by the user equipment; and
communicating the uplink transmit parameters to the radio network controller (RNC) for forwarding to the user equipment via the identified first base station.

7. The method of claim 1, wherein serving the user equipment in only the uplink direction comprises:
receiving feedback information communicated by the user equipment on an uplink data channel; and
forwarding the received feedback information to the radio network controller (RNC).

8. The method of claim 7, wherein the feedback information comprises a receive status report that indicates either an acknowledgement or a negative acknowledgement in response to a data packet received on the downlink data channel.

9. The method of claim 7, wherein the feedback information comprises signaling information that controls user equipment performance.

10. An apparatus for operating a second base station in a mobile communication system that comprises a radio network controller (RNC) operatively connected to a first base station and the second base station, the apparatus comprising:
circuitry configured to cause the second base station to monitor one or more channels of at least the first base station to receive a signal transmitted by a user equipment that is being served by the first base station;
circuitry configured to cause the second base station to detect that a power level of the signal transmitted by the user equipment exceeds a threshold power level;
circuitry configured to cause the second base station to use the received signal transmitted by the user equipment to acquire an identifier of the user equipment;
circuitry configured to cause the second base station to communicate one or more control signals with the radio network controller (RNC) of the mobile communication system to arrange for the second base station to serve the user equipment in only the uplink direction, wherein the one or more communicated control signals include uplink transmit parameters to be used when serving the user equipment and include an instruction that indicates whether the second base station is to act as a master or a slave; and
circuitry configured to cause the second base station to serve the user equipment in only the uplink direction, wherein the circuitry configured to cause the second base station to monitor one or more channels of at least the first base station to receive a signal transmitted by the user equipment comprises:
circuitry configured to cause the second base station to monitor a random access channel (RACH) of the first base station to receive a random access channel (RACH) signal transmitted by the user equipment.

11. The apparatus of claim 10, wherein the received signal from the user equipment is an uplink transmission from the user equipment to the first base station.

12. The apparatus of claim 10, wherein the circuitry configured to cause the second base station to use the received signal transmitted by the user equipment to acquire an identifier of the user equipment comprises:
circuitry configured to cause the second base station to use information contained in the received random access channel (RACH) signal transmitted by the user equipment to identify the first base station that is serving the user equipment; and
circuitry configured to cause the second base station to communicate with the identified first base station to acquire the identifier of the user equipment.

13. The apparatus of claim 12, wherein the circuitry configured to cause the second base station to communicate with the radio network controller (RNC) of the mobile communication system to arrange for the second base station to serve the user equipment in only the uplink direction comprises:
circuitry configured to cause the second base station to communicate the identifier of the user equipment to the radio network controller (RNC).

14. The apparatus of claim 10, wherein the circuitry configured to cause the second base station to serve the user equipment in only the uplink direction comprises:
circuitry configured to cause the second base station to receive a receive status report from the user equipment, wherein the receive status report indicates either an acknowledgement or a negative acknowledgement; and
circuitry configured to cause the second base station to forward the receive status report to the radio network controller (RNC).

15. The apparatus of claim 10, wherein the circuitry configured to cause the second base station to communicate with the radio network controller (RNC) comprises:
circuitry configured to cause the second base station to form the uplink transmit parameters to be used by the user equipment; and
circuitry configured to cause the second base station to communicate the uplink transmit parameters to the radio network controller (RNC) for forwarding to the user equipment via the identified first base station.

16. The apparatus of claim 10, wherein the circuitry configured to cause the second base station to serve the user equipment in only the uplink direction comprises:
circuitry configured to cause the second base station to receive feedback information communicated by the user equipment on an uplink data channel; and
circuitry configured to cause the second base station to forward the received feedback information to the radio network controller (RNC).

17. The apparatus of claim 16, wherein the feedback information comprises a receive status report that indicates either an acknowledgement or a negative acknowledgement in response to a data packet received on the uplink data channel.

18. The apparatus of claim 16, wherein the feedback information comprises signaling information that controls user equipment performance.

19. A communication system comprising:
a first base station;
a second base station; and
a radio network controller (RNC) operatively connected to the first and second base stations for controlling the first and second base stations,
wherein:
the second base station comprises:
circuitry configured to cause the second base station to monitor one or more channels of the first base station to receive a signal transmitted by a user equipment that is being served by the first base station;
circuitry configured to cause the second base station to detect that a power level of the signal transmitted by the user equipment exceeds a threshold power level;
circuitry configured to cause the second base station to use the received signal transmitted by the user equipment to acquire an identifier of the user equipment;
circuitry configured to cause the second base station to communicate one or more control signals with the radio network controller (RNC) to arrange for the second base station to serve the user equipment in only the uplink direction, wherein the one or more communicated control signals include uplink transmit parameters to be used when serving the user equipment and include an instruction that indicates whether the second base station is to act as a master or a slave; and
circuitry configured to cause the second base station to receive uplink transmissions from the user equipment and to forward information contained in the uplink transmissions to the radio network controller (RNC);
the radio network controller (RNC) comprises circuitry configured to instruct the first base station to serve the user equipment in only the downlink direction; and
the first base station comprises:
circuitry configured to transmit downlink data to the user equipment and to receive feedback information directly from the user equipment while serving the user equipment in only the downlink direction,
wherein the circuitry configured to cause the second base station to monitor one or more channels of at least the first base station to receive a signal transmitted by the user equipment comprises:
circuitry configured to cause the second base station to monitor a random access channel (RACH) of the first base station to receive a random access channel (RACH) signal transmitted by the user equipment.

* * * * *

UNITED STATES PATENT AND TRADEMARK OFFICE
CERTIFICATE OF CORRECTION

PATENT NO. : 8,315,629 B2
APPLICATION NO. : 12/391825
DATED : November 20, 2012
INVENTOR(S) : Pamp et al.

It is certified that error appears in the above-identified patent and that said Letters Patent is hereby corrected as shown below:

On the Title Page, in Item (73), under "Assignee", in Column 1, Line 1, delete "Ericsson," and insert -- Ericsson (publ), --, therefor.

In the Specifications:

In Column 6, Line 11, delete "re connected" and insert -- re-connected --, therefor.

In Column 10, Line 12, delete "step 629)." and insert -- (step 629). --, therefor.

Signed and Sealed this
Fourteenth Day of May, 2013

Teresa Stanek Rea
*Acting Director of the United States Patent and Trademark Office*